United States Patent Office  
3,658,942  
Patented Apr. 25, 1972

3,658,942  
POLYMERS OF PROPARGYL DERIVATIVES WITH QUATERNARY COMPOUNDS  
Valentin Alexeevich Kargin, Ulitsa Gaidara 7, kv. 4; Viktor Alexandrovich Kabanov, Karetny ryad 5/9, kv. 21; Kantamir Vagabovich Aliev, Leninsky prospekt 92, korpus 1, kv. 110; and Rafail Mamed Ogly Salimov, Ulitsa D. Ulyanova 3, all of Moscow, U.S.S.R.  
No Drawing. Filed Oct. 29, 1969, Ser. No. 872,407  
Claims priority, application U.S.S.R., Oct. 31, 1968, 1,282,152; Oct. 14, 1969, 1,360,704  
Int. Cl. C08f 9/00, 23/00  
U.S. Cl. 260—875                                     6 Claims

ABSTRACT OF THE DISCLOSURE

Polymers with a system of conjugated double bonds in the main chain comprising homopolymers and copolymers of quaternary compounds of monomeric amines, phosphines, arsines or their polymeric derivatives with propargyl derivatives, containing links with general formula:

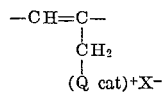

wherein (Q cat)+ is a cation containing a quaternary atom of nitrogen, phosphorus, or arsenic; and X− is Cl−, Br−, I−, OH−, or an anion comprising an ester group.

The above-mentioned compounds are used in electric, electro-technical, chemical and photochemical industry as a material with semiconductive properties, for electrically conductive coatings, thermistors and other purposes. A method for producing these compounds consists in the interaction of monomeric amines, phosphines, arsines or their polymeric derivatives with propargyl derivatives of the general formula $CH\equiv C-CH_2X$, wherein X is Cl; Br; I; OH− or a radical comprising and ester group, in organic solvents at a temperature between −40° C. and +220° C. followed by separation of the resulting product.

---

The present invention relates to new polymers with a system of conjugated double bonds in the main chain and to a method for producing the same. The new polymers according to this invention are homopolymers and copolymers of quaternary compounds of monomeric amines, phosphines, arsines or their polymeric derivatives with propargyl derivatives, containing links with the general formula:

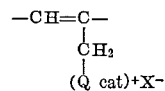

wherein (Q cat)+ is a cation containing a quaternary atom of nitrogen, phosphorus, or arsenic; X− is Cl−, Br−, I−, OH−, or an anion comprising an ester group.

These new polymers are widely used in electronic, electrotechnical, chemical and photochemical industries as a material with semiconductive properties, for electrically conductive coatings, thermistors and other purposes.

Such polymers can be prepared as either linear homopolymers and copolymers soluble in water, methanol and other common polar solvents or as cross-linked insoluble materials, stable to both acids and alkalis. These cross-linked materials can be used as electron-exchange and ion-exchange membranes.

The new compounds are black powders with a metallic gloss and have a set of electrophysical properties characteristic of electroconductive materials. Electrophysical properties and molecular weights of these polymers depend upon the nature of the parent reagents and conditions under which the synthesis is carried out.

According to the present invention the method for producing these new compounds consists in the interaction of monomeric amines, phosphines, arsines or their polymeric derivatives with propargyl derivatives of the general formula $CH\equiv C-CH_2X$, where X is Cl, Br, I, OH or a radical comprising an ester group, in organic solvents at a temperature between −40° C. and +220° C. followed by separation of the resulting product.

It is expedient to use as organic solvents the common polar solvents such as methanol, ethanol, acetone, nitromethane, nitrobenzene, acetonitrile, or propylenecarbonate and nonpolar solvents such as benzene, hexene, heptene, or toluene.

The preferable temperature is between 20° C. and 100° C.

According to the present invention the propargyl derivatives including propargyl chloride, propargyl bromide, alkyl propargyl sulphates and others are made to react with different monomeric amines, phosphines, arsines or their polymeric derivatives, including as examples: pyridine, quinoline, acridine, aminopyridines, vinylpyridines, vinylquinoline, polyvinylamines, copolymers of amines and other monomers, trialkylphosphines, triarylphosphines, trialkylarsines, triarylarsines and others.

The reaction is carried out in common organic solvents such as methanol, ethanol, propylenecarbonate, benzene etc. in the temperature range of −40° C. to +220° C., but the 20° C. to +100° C. range is preferred.

The process is carried out according to the general equation:

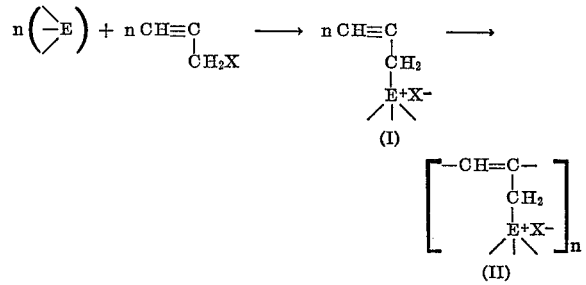

wherein E is an atom of N, P, or As; X− is Cl−, Br−, I−, OH− or an anion comprising an ester group.

At first the monomeric salt (I) is formed, which polymerizes into the polymer (II). Then the resulting products are precipitated out with diethyl ether, ethylacetate, acetone, and other agents. The resulting precipitate is separated off then reprecipitated and dried to a constant weight at a temperature between 20° C. and 80° C. under vacuum.

If the parent amines, phosphines, or arsines contain one or more groups capable of polymerisation such as $CH_2=CH-$, then the present invention provides for producing cross-linked polyelectrolytes with a system of conjugated double bonds. The degree of cross-linking can be regulated by combining different amounts of parent amines, phosphines, or arsines containing or not containing such groups.

According to the present invention it is possible to graft polyelectrolytic blocks with a system of conjugated bonds into any other polymer containing phosphine, amine or arsine groups and thereby modifying the properties of this polymer. In this way copolymers of the following structure can be obtained:

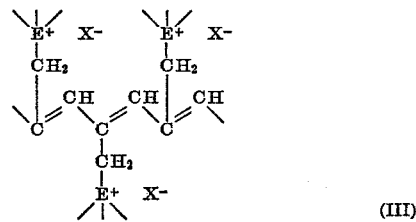
(III)

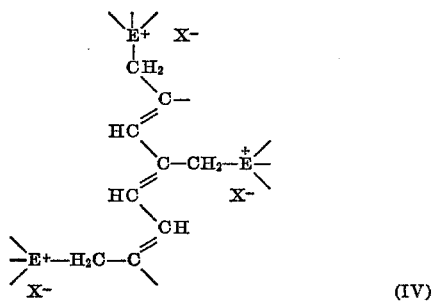
(IV)

This invention can be better understood by a study of the following examples of producing polymers with a system of conjugated bonds in the main chain.

EXAMPLE 1

3.95 g. (0.05 mol) of freshly distilled pyridine were mixed while stirring with 3.72 g. (0.05 mol) of propargyl chloride and 5 ml. of methanol in a glass tube. The tube was purged with argon for 40 min., sealed and heated at 60° C. for 30 hours. The polymeric product was recovered from the solution by adding diethyl ether, was twice reprecipitated from methanol solution and was dried to a constant weight at 60° C. under vacuum. The yield was 5.6 g.

The product was a black powder and was readily soluble in water, ethanol and other molar solvents.

An analysis showed that the product was the homopolymer of the quaternary salt of pyridine with propargyl chloride (C–61.5%, H–5.3%, N–9.2%, Cl–23.0%). The supposed structure was confirmed by IR-spectrum. The presence of absorption bands characteristic of the pyridine ring (690,770 cm.$^{-1}$) and the wide intensive band of conjugated —C=C— bonds (1600–1650 cm.$^{-1}$) were observed. The band at 2140 cm.$^{-1}$ corresponding to —C≡C— stretching vibration of propargyl was not detected.

The value of intrinsic viscosity measuerd in 0.1 N KBr solution at 25° C. was found to be 0.05 dl./g.

The value of electroconductivity was $0.74 \times 10^{-8}$ ohm.$^{-1}$cm.$^{-1}$.

EXAMPLE 2

0.79 g. (0.01 mol) of pyridine were mixed while stirring with 1.18 g. (0.01 mol) of propargyl bromide and 10 ml. of methanol in a glass tube. The tube was sealed and heated for 10 hours at 60° C. The polymeric product was separated as in Example 1. The yield was 1.6 g.

The product was a black powder, readily soluble in water, methanol and other polar solvents. The IR-spectrum of the polymer quaternary salt was characterized by absorption bands at 690,770 and 1600–1650 cm.$^{-1}$. The band at 2140 cm.$^{-1}$ was not found.

EXAMPLE 3

2 g. of poly-4-vinylpyridine (M.W. 500,000) were dissolved in 40 ml. of methanol and then to the mixture 1.5 g. of propargyl chloride were added. The reaction was carried out for 10 hours at 70° C. The product was precipitated by the addition of diethyl ether and dried to a constant weight under vacuum. The yield was 2.6 g.

The resulting polymer was a black powder with a metallic gloss insoluble in water, methanol and other organic solvents, and stable to both acids and the alkalis. A wide intensive band of absorption of —C=C— conjugated double bonds (1600–1650 cm.$^{-1}$) was observed in the IR-spectrum of the product. The band at 2140 cm.$^{-1}$ corresponding to —C≡C— stretching vibration was not found. The electroconductivity measured at 40° C. was $$1.2 \times 10^{-12}$$

ohm.$^{-1}$cm.$^{-1}$.

EXAMPLE 4

0.26 g. (0.001 mol) of triphenylphosphine were mixed with 0.30 g. (0.004 mol) of propargyl chloride and 1 ml. of benzene in a glass tube. The tube was sealed and heated for 30 hours at 60° C. The polymeric product was separated by precipitation with diethyl ether and dried to a constant weight at 40° C. under vacuum. The yield was 0.3 g. The obtained polymer was soluble in water and methanol.

The data of elementary analysis showed that the reaction product was the homopolymer of the quaternary salt of phosphine with propargyl chloride (C, 72.8%; H, 5.9%; P, 8.6%; Cl, 9.5%).

The supposed structure was also confirmed by IR-spectrum characterized by absorption bands of monosubstituted phenyl rings at 700 and 740 cm.$^{-1}$ with a wide intensive band of conjugated —C=C— double bonds (1600–1650 cm.$^{-1}$). The absorption band of —C≡C— at 2140 cm.$^{-1}$ was not found.

The value of intrinsic viscosity measured in 0.1 N KBr solution was found to be 0.04 dl./g.

EXAMPLE 5

0.3 g. (0.001 mol) of triphenylarsine were mixed while stirring with 0.75 g. (0.01 mol) of propargyl chloride and 0.5 ml. of benzene in a glass tube. The tube was sealed and heated for 50 hours at 100° C. The polymeric product was precipitated by addition of diethyl ether and dried to a constant weight. The yield was 0.28 g.

The resulting polymer was a black powder and was soluble in water and methanol. The IR-spectrum of polymeric quaternary salt of triphenylarsine with propargyl chloride was characterized by the bands at 700, 740, and 1600–1650 cm.$^{-1}$.

The value of the intrinsic viscosity of this product was 0.04 dl./g. at 25° C. in 0.1 N KBr solution

We claim:

1. Polymers with a system of conjugated double bonds in the main chain comprising homopolymers and copolymers of quaternary compounds of polymeric derivatives of amines, phosphines or arsines with propargyl derivatives containing links with general formula:

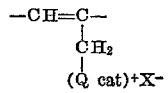

wherein (Q cat)$^+$ is a cation containing a quaternary atom selected from the group consisting of nitrogen, phosphorus, and arsenic; X$^-$ is selected from the group consisting of Cl$^-$, Br$^-$, I$^-$, OH$^-$, and anion comprising ester group.

2. A method for producing polymers with a system of conjugated double bonds in the main chain comprising homopolymers and copolymers of quaternary compounds of polymeric derivatives of amines, phosphines, or arsines with propargyl derivatives, containing links with the general formula:

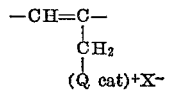

wherein (Q cat)$^+$ is a cation containing a quaternary atom selected from the group consisting of nitrogen, phosphorus, and arsenic; X$^-$ is selected from the group consisting of Cl$^-$, Br$^-$, I$^-$, OH$^-$, and an anion comprising ester group, consisting in the interaction of compounds, selected from the group consisting of polymeric derivatives of amines, phosphines, or arsines with propargyl derivatives of the general formula CH≡C—CH$_2$X, wherein X is selected from the group consisting of Cl, Br, I or a radical comprising ester group, in organic solvents at a temperature between −40° C. and +220° followed by separation of the resulting product.

3. A method as in claim 2 wherein the polymeric derivative is poly(4-vinylpyridine).

4. A method as in claim 2, wherein the solvent is a polar solvent selected from the group consisting of methanol, ethanol, acetone, nitromethane, nitrobenzene, acetonitrile and propylenecarbonate.

5. A method as in claim 2, wherein the solvent is a non-polar solvent selected from the group consisting of benzene, heptane, hexane and toluene.

6. A method as in claim 2, wherein the process is carried out at a temperature ranging from 20° C. to 100° C.

References Cited
FOREIGN PATENTS 637,889  6/1963  Japan.

OTHER REFERENCES

Okamura et al., Kogyo Kagaku Zasshi, vol. 65, pp. 728–31 (1962).

Hennion et al., Sterically Crowded Amines, Jour. of Organic Chem., vol. 30, pp. 3696–8 (1965).

Hennion et al., Quaternary Salts, Jour. of Organic Chem., vol. 31, pp. 1977–8 (1966).

SAMUEL H. BLECH, Primary Examiner

J. SEIBERT, Assistant Examiner

U.S. Cl. X.R.

260—32.4, 32.8 R, 32.8 N, 33.4 R, 33.6 UA, 80 P, 80 PS, 89.3, 89.7 N, 91.7, 884, 885